United States Patent
Jewett et al.

(10) Patent No.: US 9,153,138 B1
(45) Date of Patent: Oct. 6, 2015

(54) AGENT-BASED AIRFIELD CONFLICT RESOLUTION

(75) Inventors: Stephen P. Jewett, O'Fallon, MO (US); Thomas J. Hollerich, O Fallon, IL (US); Eric L. Nicks, O'Fallon, MO (US); Andrew Wall, O'Fallon, MO (US); William E. Wojczyk, Jr., O'Fallon, MO (US)

(73) Assignee: THE BOEING COMPANY, Chicago, IL (US)

( * ) Notice: Subject to any disclaimer, the term of this patent is extended or adjusted under 35 U.S.C. 154(b) by 371 days.

(21) Appl. No.: 12/968,450

(22) Filed: Dec. 15, 2010

(51) Int. Cl.
*G08G 5/00* (2006.01)
*G06Q 10/06* (2012.01)

(52) U.S. Cl.
CPC .............. *G08G 5/0095* (2013.01); *G08G 5/003* (2013.01); *G08G 5/0039* (2013.01); *G06Q 10/06* (2013.01); *G08G 5/00* (2013.01)

(58) Field of Classification Search
CPC ....... G08G 5/00; G08G 5/003; G08G 5/0039; G08G 5/0095; G06Q 10/06
USPC ......... 701/3, 528, 120, 122; 705/5, 7.11, 7.12
See application file for complete search history.

(56) References Cited

U.S. PATENT DOCUMENTS

| | | | | |
|---|---|---|---|---|
| 7,957,987 B2 * | 6/2011 | Langerman | | 705/5 |
| 8,214,136 B2 * | 7/2012 | Caillaud | | 701/120 |
| 2002/0147508 A1 * | 10/2002 | Miller et al. | | 700/30 |
| 2003/0050746 A1 * | 3/2003 | Baiada et al. | | 701/3 |
| 2003/0191678 A1 * | 10/2003 | Shetty et al. | | 705/8 |
| 2005/0246208 A1 * | 11/2005 | Langerman | | 705/5 |
| 2008/0312780 A1 * | 12/2008 | Peed et al. | | 701/9 |
| 2010/0042316 A1 * | 2/2010 | Caillaud | | 701/201 |
| 2010/0161156 A1 * | 6/2010 | Coulmeau et al. | | 701/3 |
| 2011/0074607 A1 * | 3/2011 | Khatwa et al. | | 340/947 |
| 2011/0251781 A1 * | 10/2011 | Brennan | | 701/120 |

OTHER PUBLICATIONS

Willkins, D.E., et al., Airlift mission monitoring and dynamic rescheduling, Engineering Applications of Artificial Intelligence (2007), doi 10.1016/j.engappai.2007.04.001.*
CAP 493 Manual of Air Traffic Services Part 1.*
J. Rong, S. Geng, J. Valasek, and T. R. loerger, "Air traffic control negotiation and resolution using an onboard multi-agent system," in Proc. Digital Avionics Syst. Conf., 2002, vol. 2, pp. 7B2-1-7B2-12.*
Oliver, I., Carvalho, F., Camargo J., Sato, M., "Multi-Agent Tools for Air Traffic Management", The 11th IEEE International Conference on Computational Science and Engineering-Workshop (2008).*
Oliveira, I., Carvalho, F., Camargo J., Sato, M., "Multi-Agent Tools for Air Traffic Management", The 11th IEEE International Conference on Computational Science and Engineering-Workshop (2008).*

(Continued)

*Primary Examiner* — John Q Nguyen
*Assistant Examiner* — Michael Whalen
(74) *Attorney, Agent, or Firm* — Toler Law Group, PC

(57) ABSTRACT

A particular method includes receiving a conflict notice from a first airfield computing agent associated with a first airfield at a first aircraft computing agent associated with a first aircraft. The conflict notice indicates that the first aircraft is associated with a first conflict of the first airfield. The method also includes identifying, based on parameters associated with the first aircraft, one or more actions associated with the first aircraft to address the first conflict.

20 Claims, 7 Drawing Sheets

(56) References Cited

OTHER PUBLICATIONS

Alice M Mulvehill, Randall Whitaker, United States Air Force Research Laboratory, Human Interaction with Software Agents (HIASA).*

Mulvehill et al., Human Interaction with Software Agents (HISA), United States Air Force Research Laboratory, Nov. 2000, (70 pgs).

Wilkins et al., Airlift Mission Monitoring and Dynamic Rescheduling, ScienceDirect—Engineering Applications of Artificial Intelligence, Apr. 2007, (11 pgs).

* cited by examiner

AGENT-BASED AIRFIELD CONFLICT RESOLUTION

FIELD OF THE DISCLOSURE

The present disclosure is generally related to agent-based airfield conflict resolution.

BACKGROUND

Conflicts at airfields can cause mission delays. Conflicts can be caused by limitations of the airfield. For example, efficiency of operations at an airfield may be related to how many aircraft are on the ground at the airfield. A number of aircraft that can be on the ground at the airfield at a particular time may be limited by a maximum-on-ground (MOG) limit. When the MOG limit is exceeded, efficiency of the airfield can be reduced. Thus, conflicts that result in the MOG limit being exceeded should be avoided. Conflicts can arise as a result of issues related to individual aircraft, crews, other limitations, or any combination thereof.

SUMMARY

Systems and methods to resolve airfield conflicts may use software agents. For example, a software agent may be associated with of each of one or more airfields and with each of one or more aircraft. The software agents may negotiate with one another to resolve potential conflicts. For example, the software agents may prevent violations of a maximum-on-ground (MOG) limitation of an airfield. To illustrate, the software agents may proactively adjust flight plans of one or more aircraft to ensure that a number of aircraft on the ground at the airfield at any given airfield does not exceed the MOG limitation of the airfield.

A particular method includes receiving, at a first aircraft computing agent associated with a first aircraft, a conflict notice from a first airfield computing agent associated with the first airfield. The conflict notice indicates that the first aircraft is associated with a first conflict of the first airfield. The method includes identifying, based on parameters associated with the first aircraft, one or more actions associated with the first aircraft that would address the first conflict. The method further includes automatically executing a first action of the one or more actions. For example, the first action may include changing a schedule associated with the first aircraft.

A particular method includes identifying a conflict associated with the first airfield at a first airfield computing agent associated with the first airfield. The method also includes identifying one or more aircraft associated with the conflict. The method further includes sending a conflict notice to one or more aircraft computing agents associated with the one or more aircraft. The conflict notice includes information descriptive of the conflict. The method also includes receiving at least one conflict notice response from at least one aircraft computing agent of the one or more aircraft computing agents. The at least one conflict notice response indicates at least one action that can be performed by the at least one aircraft to address the conflict. The method further includes automatically selecting a particular action to be executed to address the conflict. The method also includes sending an instruction to a particular aircraft computing agent. The instruction indicates that the particular action is to be executed.

In a particular embodiment, a non-transitory computer-readable medium stores instructions that are executable by a processor to cause the processor to instantiate one or more aircraft computing agents. Each aircraft computing agent includes parameters associated with a particular aircraft and decision support rules related to the parameters. The instructions are further executable by the processor to instantiate one or more airfield computing agents. Each airfield computing agent includes parameters associated with a particular airfield and conflict rules associated with the particular airfield. For example, a first airfield computing agent of the one or more airfield computing agents is configured to negotiate with the one or more aircraft computing agents to automatically address conflicts at the first airfield.

The features, functions, and advantages that have been described can be achieved independently in various embodiments or may be combined in yet other embodiments, further details of which are disclosed with reference to the following description and drawings.

DETAILED DESCRIPTION

Particular embodiments include computing agents that represent aircraft and computing agents that represent airfields, analysis and ranking algorithms, a graphical user interface, a database, or combinations thereof. The computing agents that model the aircraft may be referred to as aircraft computing agents and the computing agents that model airfields may be referred to as airfield computing agents. The aircraft computing agents may include decision support rules that are executed by one or more processors. The one or more processors may be located onboard the aircraft or located remote from the aircraft. The first airfield computing agent may be executed by a processor at the first airfield or by a processor remote from the first airfield.

An airfield computing agent may be able to detect conflicts associated with the airfield that the airfield computing agent models. An aircraft computing agent may be able to adjust a plan or schedule for the aircraft that the aircraft computing agent models. For example, the aircraft computing agent may adjust a plan or schedule for the aircraft to address a conflict at the airfield. The airfield computing agent may analyze potential solutions to the conflict that are provided by one or more aircraft computing agents to select one or more solutions using a cost function and the ranking algorithms. Thus, the airfield computing agents and the aircraft computing agents are able to resolve conflicts without human intervention. In a particular embodiment, a human can intervene when oversight is desired or is deemed necessary. For example, a human may intervene to monitor resolution of conflicts and to handle special circumstances.

Figure 1:
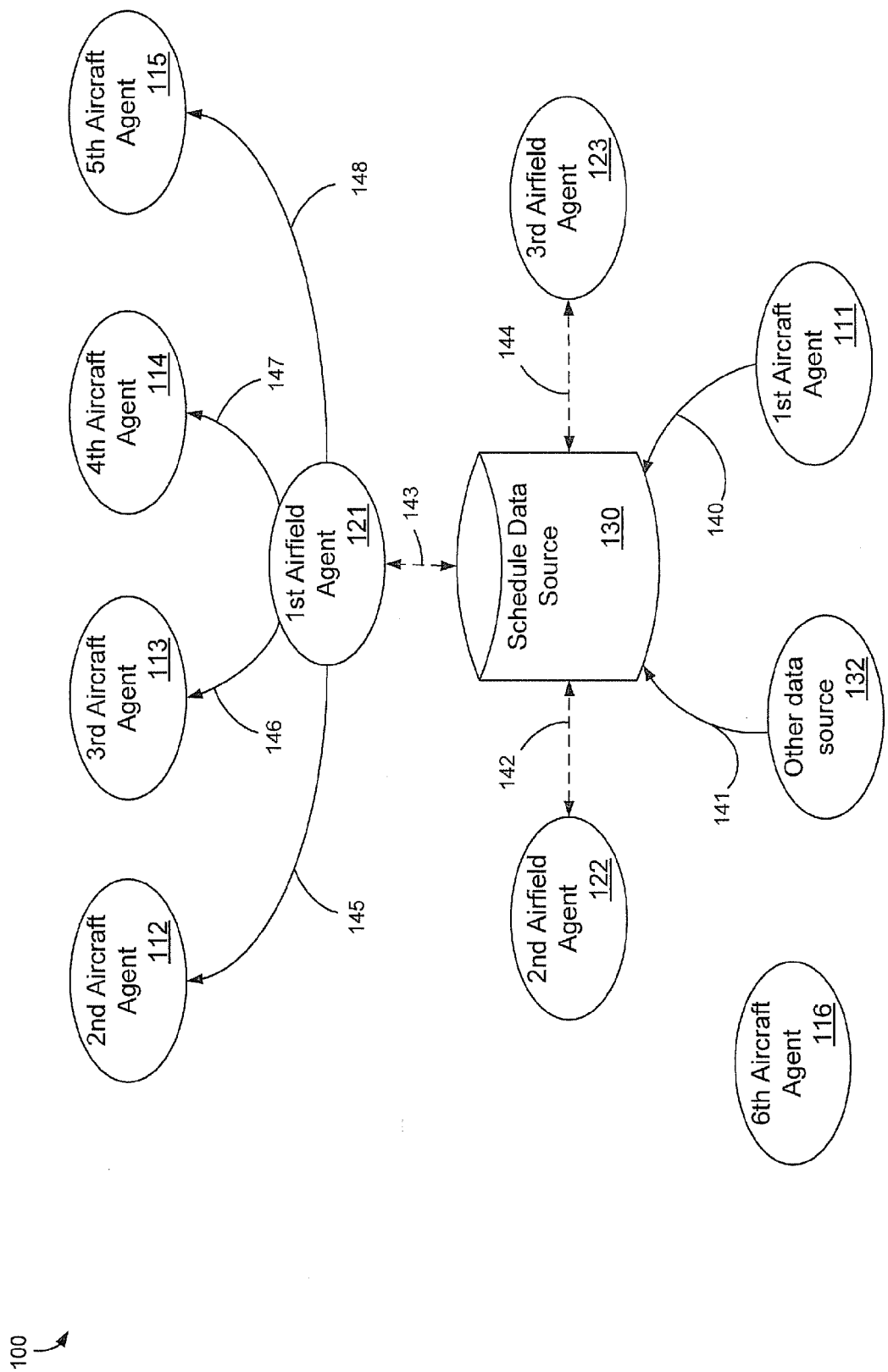
FIG. 1 is a diagram illustrating communications in a particular embodiment of a system to resolve conflicts at an airfield.
Figure 2:
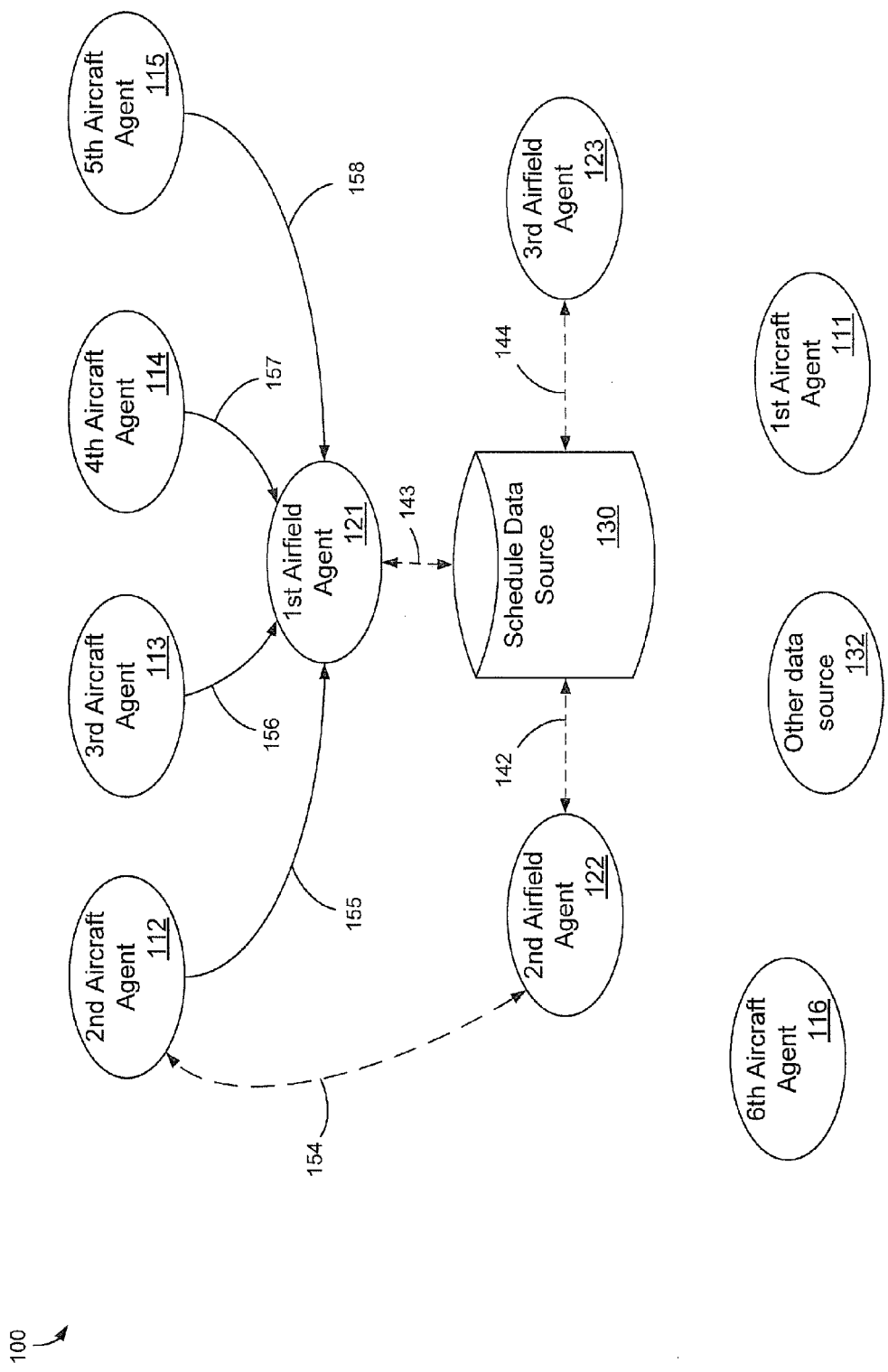
FIG. 2 is a diagram illustrating communications in a particular embodiment of a system to resolve conflicts at an airfield.
Figure 3:
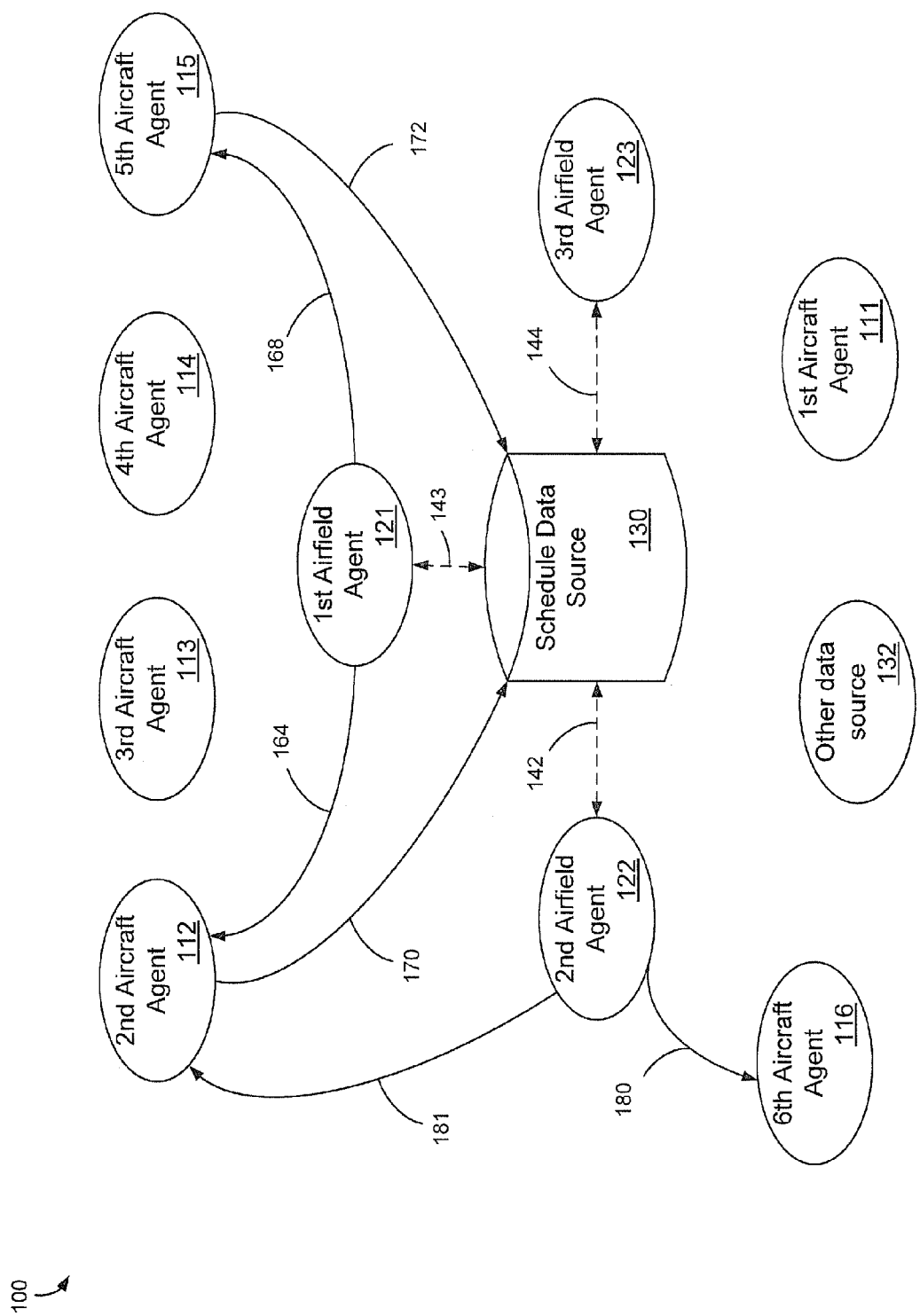
FIG. 3 is a diagram illustrating communications in a particular embodiment of a system to resolve conflicts at an airfield.

FIGS. 1-3 are diagrams illustrating communications in a particular embodiment of a system 100 to resolve conflicts at an airfield. In the system 100, a plurality of computing agents communicates with one another to address potential conflicts. In a particular embodiment, the computing agents are software modules (e.g., objects) that are executed by one or more processors. Alternately, the computing agents may include hardware computing elements, such as application specific integrated circuits. Each computing agent models and acts on behalf of a physical entity or system. For example, the computing agents may include a plurality of aircraft computing agents 111-116. Each of the aircraft computing agents 111-116 models a particular aircraft.

In a particular embodiment, each of the aircraft computing agents 111-116 includes parameters associated with or descriptive of a corresponding aircraft and includes decision support rules associated with the corresponding aircraft. For example, a first aircraft computing agent 111 may model a first aircraft and may include parameters associated with or descriptive of the first aircraft, such as a type of the aircraft, equipment of the aircraft, a maintenance or operational schedule of the aircraft, crew assigned to the aircraft, crew schedules, operating restrictions or approvals associated with the first aircraft or the crew, and so forth. The first aircraft computing agent 111 may also include decision support rules associated with the first aircraft. For example, the decision support rules may include a cost function that determines a cost of changing parameters associated with the aircraft. The cost function may be evaluated in terms of monetary cost or another cost, such as schedule delay or an arbitrary cost value (e.g., based on weights assigned to various parameters).

Each of the airfield computing agents 121-123 may include or implement conflict rules that are adapted to identify potential conflicts associated with a corresponding airfield. For example, a first airfield computing agent 121 may include conflict rules to identify potential conflicts at a first airfield that is modeled by the first airfield computing agent 121. The system 100 may also include a schedule data source 130 that includes a record of schedules and plans associated with airfields and aircraft represented by the computing agents in the system 100. For example, the schedule data source 130 may be a master schedule that includes mission plans (e.g., flight plans, etc), maintenance plans, and other scheduled activities associated with the airfields and aircraft. In a particular embodiment, the airfield computing agents 121-123, the aircraft computing agents 111-116, or both, may be able to access and update the schedule data source 130. For example, the first aircraft computing agent 111 may access the schedule data source 130 to determine some of the parameters associated with the first aircraft, such as schedule parameters. The first aircraft computing agent 111 may also change a plan or schedule associated with the first aircraft by updating a record at the schedule data source 130.

The system 100 may also include or receive data from other data sources 132 that provide information to the schedule data source 130, to the airfield computing agents 121-123, to the aircraft computing agents 111-116, or any combination thereof. For example, the other data sources 132 may include weather data stations. In another example, the other data sources 132 may include computing systems that provide information about clearances, such as domestic clearances or diplomatic clearances.

In operation, data at the schedule data source 130 may be updated. For example, the first aircraft computing agent 111 may send a schedule update 140 to the schedule data source 130 to update a schedule associated with the first aircraft. In another example, one or more other data sources 132 may send updated data 141 to the schedule data source 130. Airfield computing agents 121-123 in communication with the schedule data source 130 via corresponding data links 142-144 may detect the updated data at the schedule data source 130 and may check for conflicts caused by the updated data.

One or more of the airfield computing agents 121-123 may identify a potential conflict. For example, in the example of FIG. 1, the first airfield computing agent 121 may identify a potential conflict associated with the first airfield. The potential conflict may be a result of a change associated with an aircraft. For example, an aircraft that was not scheduled to land at the first airfield may unexpectedly land at the first airfield, a new mission may be added that includes the aircraft landing at the airfield, or a crew that was expected to support the aircraft may become unavailable (e.g., due to illness, other priorities, lack of diplomatic clearances, etc.). The potential conflict may be a result of a change associated with the first airfield. For example, equipment or facilities that are scheduled for use at the first airfield may become unavailable, weather conditions may change at the airfield, legal or diplomatic changes may occur that affect the first airfield, and so forth. The potential conflict may be a result of a change at another airfield or aircraft. For example, a second airfield computing agent 122 modeling a second airfield may reroute an aircraft from the second airfield to the first airfield to avoid a conflict at the second airfield.

When the potential conflict is identified by an airfield computing agent, the airfield computing agent may send a conflict notice to aircraft computing agents of aircraft that contribute to the potential conflict. For example, in FIG. 1, the first airfield computing agent 121 may send conflict notices 145-148 to a second aircraft computing agent 112, a third aircraft computing agent 113, a fourth aircraft computing agent 114, and a fifth aircraft computing agent 115. The conflict notices 145-148 may include information that describes the potential conflict, e.g., a date and/or time that the potential conflict is expected to occur, a resource of the first airfield that is affected by the potential conflict, a limitation of the first airfield that causes the potential conflict, other information descriptive of the potential conflict, or any combination thereof.

Referring to FIG. 2, each of the aircraft computing agents 112-115 that received a conflict notice may attempt to identify actions that can be taken to address the potential conflict. For example, the third aircraft computing agent 113 that models a third aircraft may determine whether a schedule associated with the third aircraft can be changed to address the potential conflict. In another example, the second aircraft computing agent 112 may negotiate 154 with the second airfield computing agent 122 to determine whether a schedule associated with the second aircraft can be changed. To illustrate, the second aircraft computing agent 112 may send a query to the second airfield computing agent 122 to request information regarding whether a particular action of the one or more actions can be performed, and the second airfield computing agent 122 may respond to the query. In an illustrative example, the query may request permission for the second aircraft to land at the second airfield (e.g., rather than at the first airfield). In another illustrative example, the second aircraft computing agent 112 may request other permissions related to the second airfield via the second airfield computing agent 122, such as permission to refuel at the second airfield, permission to depart from the second airfield at a different time, or permission to have maintenance activities performed at the second airfield. In yet another illustrative example, the second aircraft computing agent 112 may request that other actions related to the second airfield be approved, such as rescheduling cargo to another aircraft.

After identifying one or more actions that could be taken to address the conflict, the aircraft computing agents 112-115 that received the conflict notice may apply a cost function to identify a lowest cost action of the identified actions. For example, the second aircraft computing agent 112 may determine three actions that could be performed by the second aircraft to address the conflict. The second aircraft computing agent 112 may sort the three actions based on cost to the second aircraft. To illustrate, the cost function may measure an amount of change to a schedule of the second aircraft with more change indicating higher cost to the second aircraft. Other cost functions may be used in addition or in the alternative. One or more potential actions may be eliminated as a result of the cost function. For example, when a particular cost analysis satisfies a threshold, the associated action may be removed from consideration. To illustrate, the second aircraft computing agent may include a parameter that specifies a maximum schedule slip threshold for the second aircraft. When analysis of a particular action using the cost function indicates that the schedule of the second aircraft will slip more than the maximum schedule slip threshold the particular action may be removed from consideration.

One or more of the identified actions to address the potential conflict may be communicated to the first airfield computing agent 121 via conflict responses 155-158. The conflict responses 155-158 may each identify at least one action that may be performed to address the potential conflict. The conflict responses 155-158 may also include cost information indicating cost related to each action. In a particular embodiment, each conflict response 155-158 identifies a lowest cost action identified by the aircraft computing agent 112-115 that sent the conflict response 155-158.

Referring to FIG. 3, the first airfield computing agent 121 may analyze the conflict responses 155-158 received from the aircraft computing agents 112-115. The first airfield computing agent 121 may select one or more of the actions to be performed to address the potential conflict. For example, the first airfield computing agent 121 may select a lowest cost action of the identified actions. In another example, the first airfield computing agent 121 may select a lowest cost set of actions that address the potential conflict. A cost analysis performed by the first airfield computing agent 121 may be the same as or different than a cost analysis performed by aircraft computing agents 112-115. For example, the first airfield computing agent 121 may determine an overall schedule slip cost (e.g., total number of hours or days of schedule slip across all aircraft associated with the first airfield). In another example, the first airfield computing agent 121 may consider mission or planning priorities associated with the first airfield that are not considered in the cost functions of the aircraft computing agents 112-115. For example, the first airfield computing agent 121 may consider a cost associated with ground personnel at the first airfield.

The first airfield computing agent 121 may send instructions 164, 168 to one or more aircraft computing agents 112, 115 associated with the selected actions. The instructions 164, 168 may direct the aircraft computing agents 112, 115 to perform the selected actions. For example, the second aircraft computing agent 112 and a fifth aircraft computing agent 115 may each send a schedule change notice 170, 172 to the schedule data source 130.

In a particular embodiment, each potential conflict may be addressed as a separate concern or event. Accordingly, when the second aircraft computing agent 112 and the fifth aircraft computing agent 115 modify their schedules, a new potential conflict may be caused at another airfield. For example, based on the second airfield computing agent 122 changing a schedule of the second aircraft, a new conflict may arise at the second airfield. In this example, the second airfield computing agent 122 may send conflict notices 180 and 181 to aircraft computing agents 112, 116 associated with aircraft that contribute to the conflict. By iteratively addressing potential conflicts, a reduced cost overall solution may be identified. Weighting of the cost function may be used to reduce a likelihood of the system 100 entering a looping state (e.g., where changes are continuously made then unmade in favor of other changes). In a particular embodiment, an action that is identified to address a conflict may be deferred (i.e., not acted upon immediately) while one or more additional iterations are performed to identify other actions that address the conflict. Thus, the system 100 may be prevented from looping by deferring performance of identified actions until a steady state is reached. For example, actions may be deferred until a threshold is satisfied. To illustrate, the threshold may limit a number of iterations to identify actions to resolve the conflict (e.g. a number of conflict notices), an amount of time taken to identify actions, a cost threshold or a set of cost thresholds that are considered to indicate that the conflict is adequately addressed, another threshold that limits continued attempts to identify actions to address the conflict, or any combination thereof.

In a particular embodiment, the airfield computing agents and the aircraft computing agents may be part of a software system that enables automatic avoidance of airfield conflicts. For example, the software system may prevent an airfield exceeding a maximum-on-ground (MOG) limit by adjusting flight plans and airfield activities so that a number of aircraft on the ground at an airfield does not exceed the capabilities of the airfield. In a particular embodiment, a network of computing agents may be used to model a set of aircraft and airfields. The distributed computing agents may resolve potential MOG problems by adjusting schedules of individual aircraft and a schedule of on-ground activities at each airfield. Conflicts may be addressed via a rule-based evaluation and a cost function.

Figure 4:
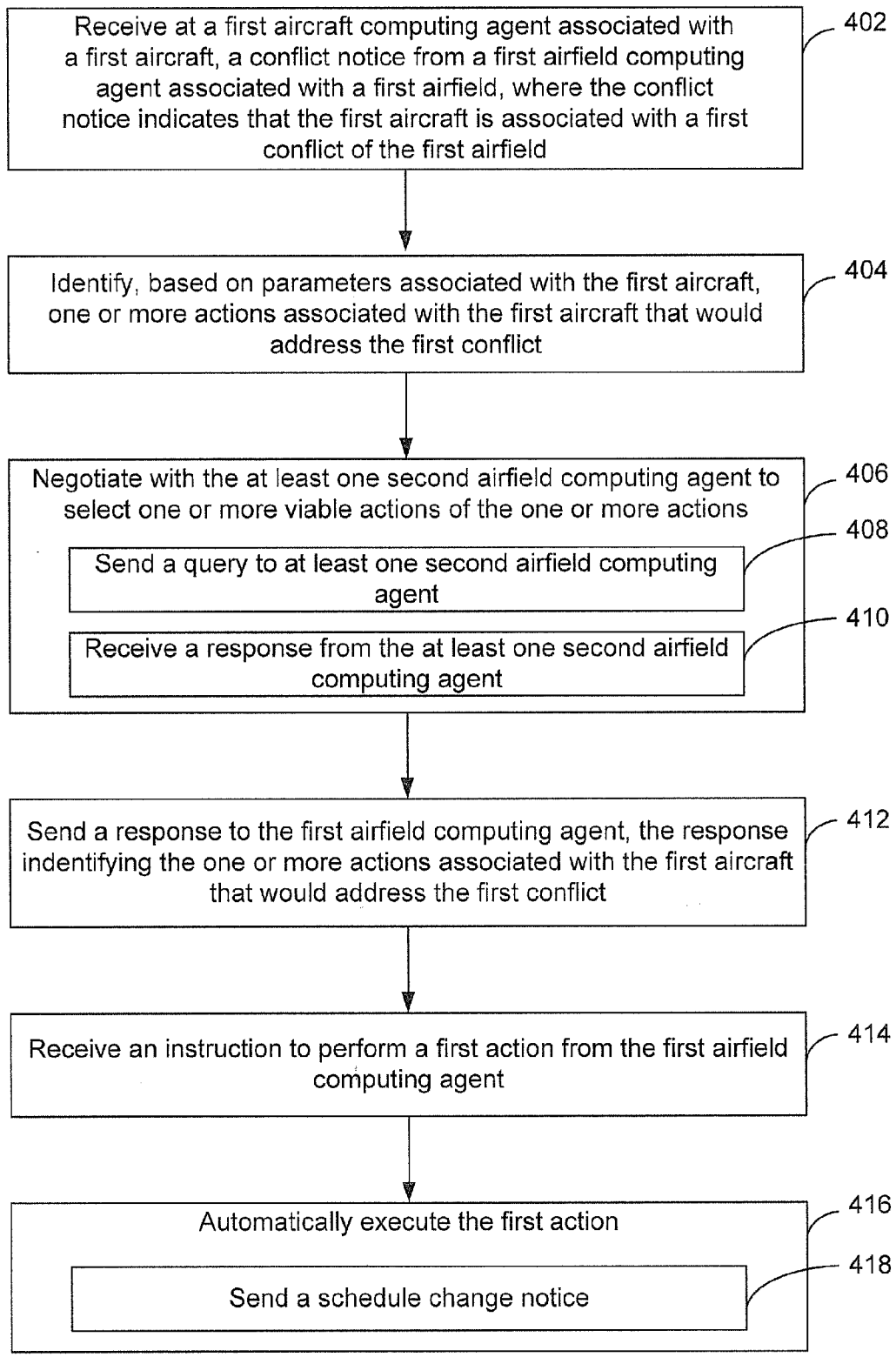
FIG. 4 is a first embodiment of a method of resolving conflicts at an airfield.

FIG. 4 is a first embodiment of a method of resolving conflicts at an airfield. The method may be performed by a system, such as the system 100 of FIGS. 1-3, that includes one or more airfield computing agents and one or more aircraft computing agents executed by one or more computing systems. For example, the aircraft computing agents may include at least a first aircraft computing agent associated with a first aircraft, and the airfield computing agents may include at least a first airfield computing agent associated with a first airfield. The first aircraft computing agent may include decision support rules that are executed by one or more processors. The one or more processors may be located onboard the first aircraft or located remote from the first aircraft. When the one or more processors are located onboard the first aircraft, the aircraft may also include communications equipment that enables the first aircraft computing agent to communicate with one or more other computing agents. The first airfield computing agent may include conflict rules that are executed by the one or more processors to identify operational conflicts at the first airfield and to attempt to negotiate with one or more aircraft agents to automatically resolve the operational conflicts. The first airfield computing agent may be executed by a processor at the first airfield or by a processor remote from the first airfield. The first aircraft computing agent and the first airfield computing agent may be executed by separate processors or by the same processor. In a particular embodiment, the first aircraft computing agent and the first airfield computing agent may include computer executable instructions. To illustrate, the instructions may be generated using Java Agent Development (JADE) framework.

The method may include, at 402, receiving a conflict notice at the first aircraft computing agent from the first airfield computing agent. The conflict notice may indicate that the first aircraft is associated with a first conflict of the first airfield. For example, the conflict may be related to a maximum-on-ground (MOG) limit, aircraft schedules, airfield schedules, aircraft status, crew status, diplomatic clearances, crew travel permissions, aircraft due home dates, aircraft maintenance schedules, or any combination thereof.

The method may include, 404, identifying one or more actions associated with the first aircraft that would address the first conflict. The one or more actions may be identified based on parameters associated with the first aircraft. For example, the parameters may include crew parameters, maintenance parameters, flight plan parameters, legal requirements, environmental parameters, aircraft limitations, or any combination thereof. Crew parameters may include information about the crew (e.g., flight crew or ground crew) associated with the aircraft, such as duty schedules and availability (e.g., whether the crew is available at particular times), rest requirements (e.g., whether the crew will be in compliance with rest requirements), etc. Maintenance parameters may include information about scheduled maintenance or other maintenance factors related to the aircraft (e.g., when the aircraft is due for particular maintenance or inspections, etc.). Flight plan parameters may include a flight schedule for the aircraft. Legal requirements may include clearances and conditions for particular flights of the aircraft (e.g., domestic or diplomatic clearances). Environmental parameters may include conditions in which the aircraft can operate (e.g., whether the aircraft can operate in particular weather conditions). Aircraft limitations may include whether the aircraft is capable of performing particular missions (e.g., does the aircraft have desired equipment or approval to perform particular tasks, etc.).

The method may include, at 406, negotiating with at least one second airfield computing agent to select one or more viable actions of the one or more actions. For example, negotiating with the at least one second airfield may include sending a query to at least one second airfield computing agent, at 408. The query may request information to determine whether a particular action can be performed. To illustrate, one or more actions that may be performed by the first aircraft may be identified by the first aircraft computing agent and may be sent to the at least one second airfield computing agent via the query. The at least one second airfield computing agent may send a response to the query and the response may be received, at 410.

The method may include, at 412, sending a response to the first airfield computing agent from the first aircraft computing agent. The response may identify one or more actions associated with the first aircraft that would address the first conflict. For example, the one or more actions may include changing a schedule of the first aircraft. The one or more actions may address the first conflict by fully resolving the conflict or by at least partially resolving the conflict. When the one or more actions do not fully resolve the conflict, the first airfield computing agent may send one or more second conflict notices to address additional portions of the conflict. For example, when the conflict includes exceeding the MOG limit by two aircraft and only one aircraft has indicated an ability to execute an action that reduces the number of aircraft on the ground, the MOG limit may still be exceeded by one aircraft. Accordingly, the first airfield computing agent may send the one or more second conflict notices.

The method may include, at 414, receiving an instruction to perform the first action from the first airfield computing agent. The method may also include, at 416, automatically executing a first action of the one or more actions in response to the instruction. The first action may include sending a schedule change notice, at 418. For example, the schedule change notice may be sent to the first airfield computing agent, the second airfield computing agent, a second aircraft computing agent, a scheduling database, or any combination thereof.

Accordingly, the method may enable automatically conflict resolution associated with an airfield by use of computing agents. For example, the software agents may negotiate with one another to proactively adjust plans or schedules associated with the aircraft or the airfield to avoid the conflict.

Figure 5:
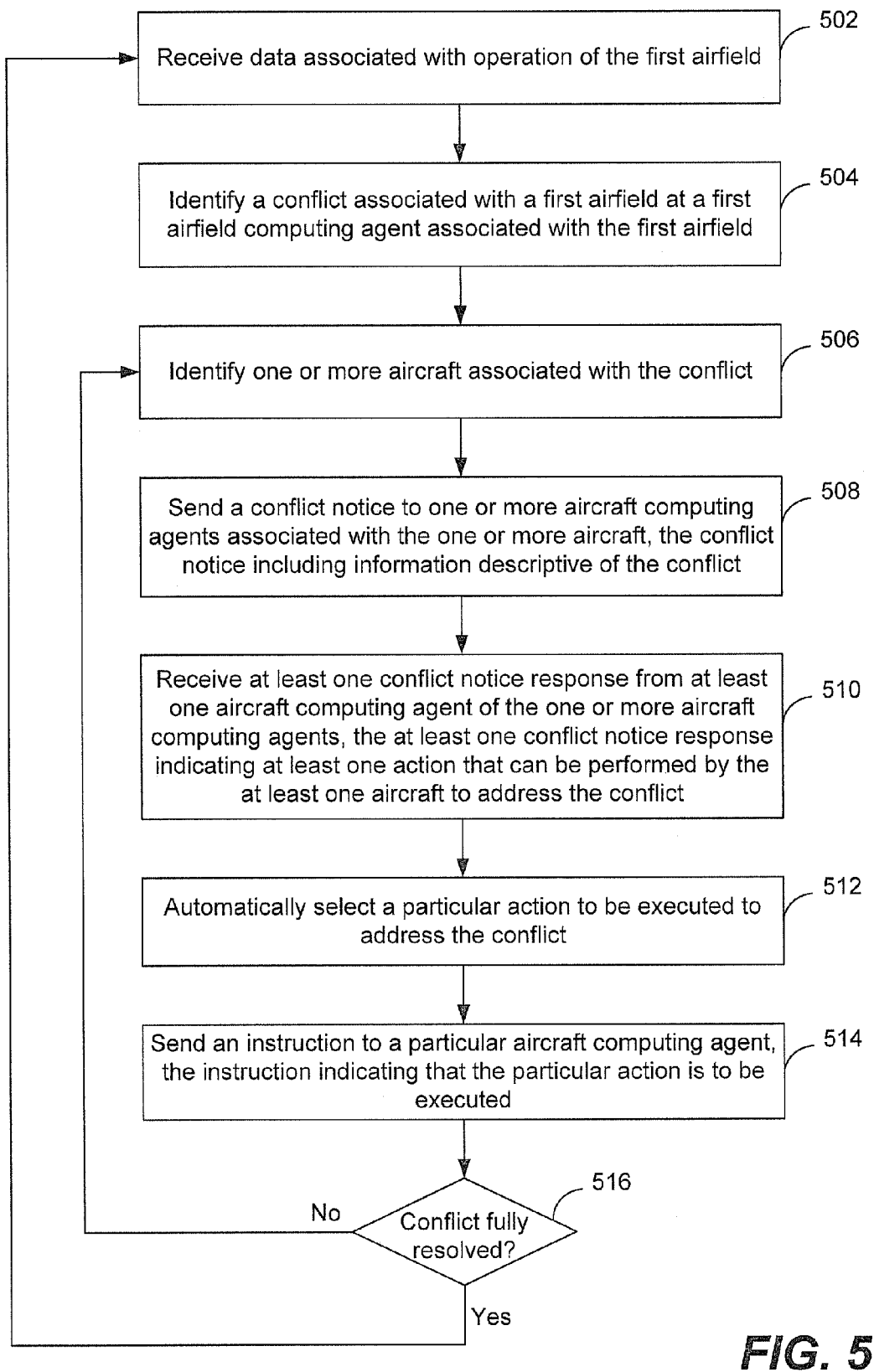
FIG. 5 is flow chart of a second embodiment of a method of resolving conflicts at an airfield.

FIG. 5 is a flow chart of a second embodiment of a method of resolving conflicts at an airfield. The method may be performed by a system, such as the system 100 of FIGS. 1-3, that includes one or more airfield computing agents and one or more aircraft computing agents executed by one or more computing systems. For example, the aircraft computing agents may include at least a first aircraft computing agent associated with a first aircraft, and the airfield computing agents may include at least a first airfield computing agent associated with a first airfield. The first aircraft computing agent may include decision support rules that are executed by one or more processors. The one or more processors may be located onboard the first aircraft or located remote from the first aircraft. The first airfield computing agent may include conflict rules that are executed by the one or more processors to identify operational conflicts at the first airfield and to attempt to negotiate with one or more aircraft agents to automatically resolve the operational conflicts. The first airfield computing agent may be executed by a processor at the first airfield or by a processor remote from the first airfield. The first aircraft computing agent and the first airfield computing agent may be executed by separate processors or by the same processor.

The method may include, at 502, receiving data associated with operation of the first airfield. For example, the data may include weather data, weather forecast data, aircraft crew information, aircraft status information, flight plan information, other information about schedules or operations of the first airfield, or any combination thereof. A conflict associated with the first airfield may be identified at the first airfield computing agent, at 504. For example, the conflict may be identified based on the data associated with the operation of the first airfield. The conflict may be identified based on a condition associated with the first airfield. For example, the condition may include at least one of parking maximum-on-ground (MOG) standard, working MOG standard, weather, airfield condition reports, and airfield prior landing permission requests.

In a particular embodiment, the first airfield computing agent identifies potential conflicts by calculating a number of aircraft expected to be on ground at the first airfield at particular times in the future to detect potential MOG violations. The first airfield computing agent may also determine whether particular resources of the first airfield are expected to be exceeded based on schedules and plans associated with the first airfield, schedules and plans associated with one or more aircraft scheduled to be at the first airfield, or any combination thereof.

When a conflict is identified, the method may include, at 506, identifying one or more aircraft associated with the conflict. For example, one or more aircraft that contribute to the conflict may be identified. A conflict notice may be sent to one or more aircraft computing agents associated with the one or more aircraft, at 508. The conflict notice may include information descriptive of the conflict.

In response to the conflict notice, the one or more aircraft computing agents may attempt to identify actions that address the conflict. The method may include, at 510, receiving at least one conflict notice response from at least one aircraft computing agent of the one or more aircraft computing agents. The at least one conflict notice response may indicate at least one action that can be performed by the at least one aircraft to address the conflict. In a particular embodiment, the at least one action may include a schedule or plan change associated with the at least one aircraft.

The method may include, at 512, automatically selecting a particular action to be executed to address the conflict. The particular action may be selected based on a predicted cost of executing the particular action. For example, the cost may be predicted using a cost function that ranks actions based on specified criteria. To illustrate, the specified criteria may include a number of aircraft affected, an amount of a schedule change for the particular aircraft, a cumulative amount of schedule change for all aircraft affected by the at least one action, another cost related factor, or any combination thereof.

The method may include, at 514, sending an instruction to a particular aircraft computing agent. The instruction may indicate that a selected action is to be executed. The method may include, at 516, determining whether the selected action is expected to fully resolve the conflict. When the selected action is expected to fully resolve the conflict, the method may end or may receive additional data related to the operation of the first airfield.

When the selected action only partially resolves the conflict, the method may attempt to identify other actions to resolve additional portions of the conflict. For example, the method may include sending a second conflict notice to the one or more aircraft computing agents associated with the one or more aircraft. The second conflict notice may include information descriptive of the partially resolved conflict. At least one second conflict notice may be received from the at least one second aircraft computing agent of the one or more aircraft computing agents. The at least one second conflict notice response may indicate at least one second action that can be performed by at least one second aircraft to address the partially resolved conflict. A particular second action may be automatically selected to be executed to address the partially resolved conflict. A second instruction may be sent to a particular second aircraft computing agent. The second instruction may indicate that the particular second action is to be executed.

Accordingly, the method may enable automatically resolving conflicts associated with an airfield by use of computing agents. For example, the software agents may negotiate with one another to proactively adjust plans or schedules associated with the aircraft or the airfield to avoid the conflict.

Figure 6:
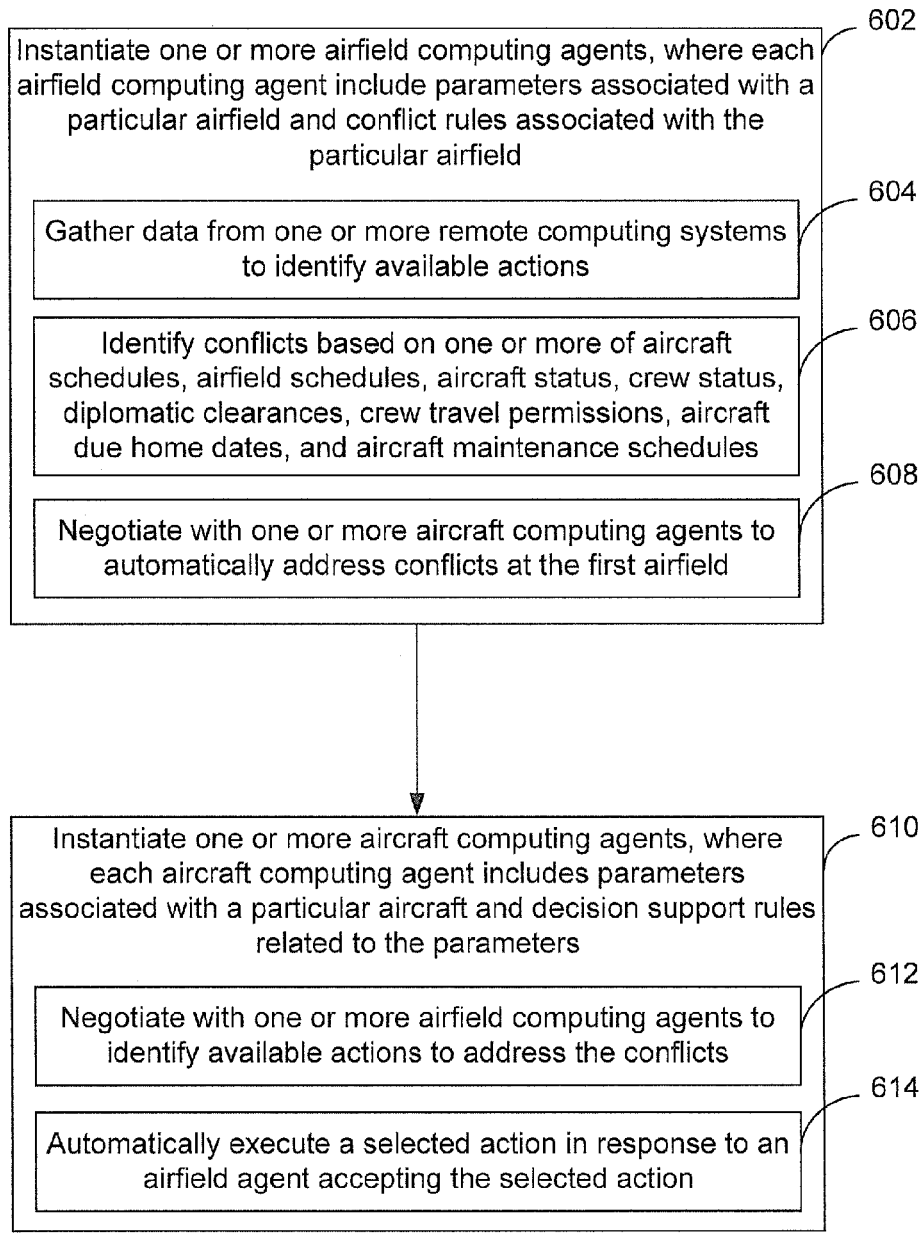
FIG. 6 is flow chart of a third embodiment of a method of resolving conflicts at an airfield.

FIG. 6 is a flow chart of a third embodiment of a method of resolving conflicts at an airfield. The method may be performed by a computing system, such as the system 100 of FIGS. 1-3. The method may include, at 602, instantiating one or more airfield computing agents. Each airfield computing agent includes parameters associated with a particular airfield and conflict rules associated with the particular airfield. For example, each of the airfield computing agents may be a software object that is instantiated with the parameters and values associated with a corresponding airfield. One or more of the airfield computing agents may gather data from one or more remote computing systems to identify available actions, at 604. For example, a first airfield computing agent may be adapted to identify conflicts at a first airfield. The first airfield computing agent may identify a conflict based on one or more of aircraft schedules, airfield schedules, aircraft status, crew status, diplomatic clearances, crew travel permissions, aircraft due home dates, aircraft maintenance schedules, or any combination thereof, at 606. The one or more airfield computing agents may negotiate with the one or more aircraft computing agents to automatically address conflicts at the first airfield, at 608.

The method may include, at 610, instantiating one or more aircraft computing agents. Each aircraft computing agent may include parameters associated with a particular aircraft and decision support rules related to the parameters. For example, each of the aircraft computing agents may be a software object that is instantiated with the parameters and values associated with a corresponding aircraft. A first aircraft computing agent may negotiate with the one or more airfield computing agents to identify available actions to address a conflict identified by one of the airfield computing agents, at 612. The first computing agent may automatically execute a selected action in response to an airfield agent accepting the selected action, at 614.

In a particular embodiment, a maximum-on-ground (MOG) conflict (e.g., violations of a MOG limit) occurs when a number of aircraft on the ground at an airfield exceeds the MOG limit. When the MOG limit is exceeded, efficiency of the airfield may deteriorate. Accordingly, airfield activities (e.g., arrivals, departures, servicing, holding, etc.) may be scheduled and planned to account for the MOG limit. Schedules and plans may change due to unforeseen circumstances, so scheduling and planning may be dynamic in order to react to such changes.

Particular embodiments use airfield computing agents to model airfields and aircraft computing agents to model aircrafts. An airfield computing agent may be able to proactively detect a potential conflict associated with the airfield. The airfield computing agent may send a notice to aircraft computing agents that model aircraft that contribute to the conflict. Each of the aircraft computing agents may respond to the notice from the airfield computing agent by identifying actions that can be taken by the aircraft computing agent. For example, a first aircraft computing agent that models a first aircraft may identify actions that adjust a plan or schedule for the aircraft to address the conflict. The actions identified by one or more aircraft computing agents may be provided to the airfield computing agent. The airfield computing agent may select one or more actions for execution based on a cost function.

Accordingly, a system including the airfield computing agents and the aircraft computing agents may be able to resolve conflicts without human intervention. In a particular embodiment, a human may intervene when such oversight is desired. For example, a human may intervene to monitor resolution of conflicts and to handle special circumstances. In a particular embodiment, the system may be capable of reporting potential conflicts. For example, an alert message related to a potential conflict may be provided to a human operator. The system may also be able to generate reports describing results of analyzing a conflict, analyzing potential solutions to the conflict, a rationale behind a particular planning or scheduling change, or any combination thereof.

In a particular embodiment, conflicts are resolved in an iterative manner. For example, a first conflict may be resolved in a manner that generates one or more additional conflicts. The one or more additional conflicts may be resolved subsequently as separate conflicts. To illustrate, a set of rules and a cost function may be used to generate and to evaluate potential solutions to the first conflict. The rules, the cost function, or both, may rank solutions based on various criteria, such as a smallest number of aircraft affected, minimal flight times, a smallest overall time change, other factors, or a combination thereof. One or more of the solutions may be selected based on the cost function. When the selected solution only partially resolves the conflict or causes one or more other conflicts, the partially resolved conflict or the one or more other conflicts may be addressed as a new conflict. Conflicts may be resolved proactively (e.g., before one or more aircraft missions start). For example, when weather delays, maintenance issues or other changes in resource availability occur, conflicts that are caused at one or more airfields may be resolved.

To proactively address conflicts, computing agents (e.g., airfield computing agents and aircraft computing agents) may analyze plans and schedules related to aircraft missions to identify potential conflicts. Data descriptive of the plans and schedules may be stored at a data base. The data may include, for example, mission schedules, mission priorities, crew availability, weather, threats, diplomatic clearances, refueling status, other aircraft mission information, or a combination thereof. An airfield may support differing numbers of various aircraft types. Accordingly, the data may differentiate between aircraft types when identifying or resolving a potential conflict. The plans and schedules may be updated to address the potential conflict.

A particular embodiment may be capable of dynamically responding to planning or scheduling changes caused by addition, deletion, or modification of missions. The system may also be capable of dynamically responding to changes caused by external factors, such as weather or changes in aircraft capabilities.

By proactively identifying conflicts, systems and methods described herein can resolve potential conflicts before the potential conflicts actually manifest themselves. Early detection and resolution of conflicts can result in reduced impact to schedules and less disruption of an overall plan.

Figure 7:
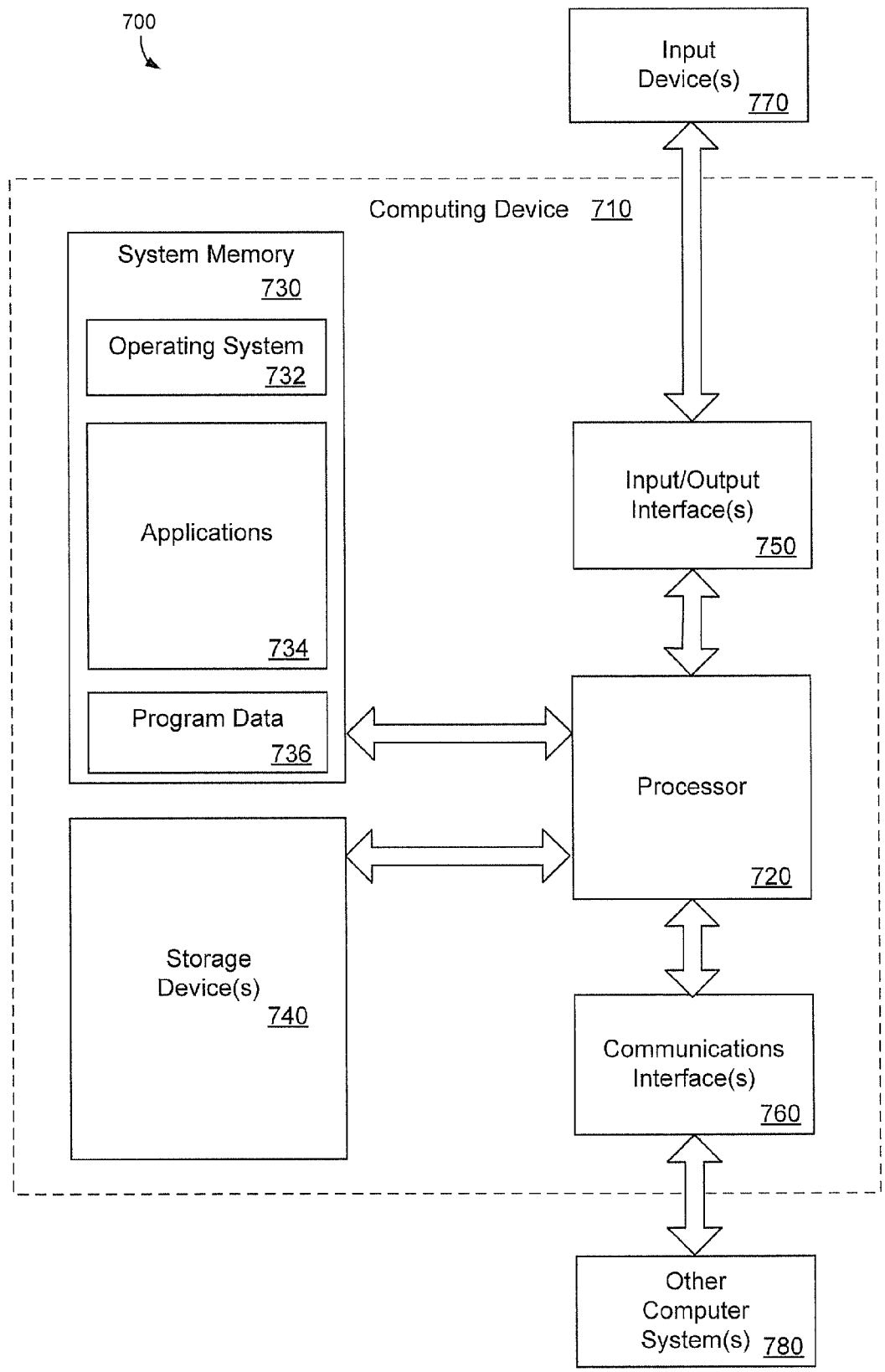
FIG. 7 is block diagram of a particular embodiment of a general purpose computer system.

FIG. 7 is a block diagram illustrating a particular embodiment of a computer system that may implement one or more of the disclosed methods of agent-based airfield conflict resolution. In a particular embodiment, one or more of the disclosed methods of agent-based airfield conflict resolution, or portions thereof, may be implemented using processor-readable instructions executable by one or more processors. The computing system 700 may include a computing device 710, which may be implemented as or incorporated into various other devices, such as a personal computer (PC), a tablet PC, a mobile device, a communications device, a control system, an avionics system, or any other machine capable of executing a set of instructions (sequential or otherwise) that specify actions to be taken by that machine. Further, while the computing system 700 is illustrated as a single computer device 710, the term "system" includes any collection of systems or sub-systems that individually or jointly execute a set, or multiple sets, of instructions to perform one or more computer functions. While FIG. 7 illustrates one embodiment of the particular computing system 700, other computer systems or computing architectures and configurations may be used for carrying out the methods of agent-based airfield conflict resolution described herein.

The computing device 710 includes at least one processor 720. The processor 720 may include a single-chip processor (with one or more processing cores or logical partitions) or multiple processors. In a particular embodiment, the processor 720 is a programmable digital processor that controls operation of the computing device 710. For example, using instructions retrieved from a system memory 730, the processor 720 controls the reception and manipulation of input data and the generation of output data (e.g., to a display or other output device).

The processor 720 may be coupled to the system memory 730. The system memory 730 may include any suitable non-transitory, computer-readable storage media depending on, for example, whether data access needs to be bi-directional or uni-directional, speed of data access desired, memory capacity desired, other factors related to data access, or any combination thereof. The system memory 730 may include various memory devices, such as registers, caches, volatile memory, and non-volatile memory. The system memory 730 can include operating instructions such as an operating system 732, one or more applications 734, and program data 736 used by the processor 720 to perform functions of the computing device 710.

The computing device 710 may also include storage devices 740 to provide additional data storage capacity. The storage devices 740 may be coupled either bi-directionally or uni-directionally to processor 720. In various embodiments, the storage devices 740 may include non-transitory, computer-readable storage media such as magnetic tape, flash memory, PC-CARDS, portable mass storage devices, optical or holographic storage devices, magnetic or electromagnetic storage devices, and read-only or random access memory devices. Like the system memory 730, the storage devices 740 may include operating instructions (e.g., program code), data, or both.

The processor 720 may be coupled to an input/output interface 750 to enable the computing device 710 to receive input and to provide output to input/output devices 770. Examples of output devices may include display devices, speakers, printers, or other devices that provide an output in a manner that is perceptible by a user (e.g., haptic devices). Examples of input devices may include keyboards, pointing devices, biometric devices, microphones, sensors, or other devices to sense or receive user input or other input. The processor 720 may also be coupled to a communications interface 760 (such as a wireless network interface, a modem, an Ethernet interface, or another device to output or receive data from another computer system or other machine). The communications interface 760 may enable data communications between the computing device 710 and other computer systems 780.

In a particular embodiment, dedicated hardware may be used to implement at least a portion of the systems or methods of agent-based airfield conflict resolution described herein. For example, application specific integrated circuits, programmable logic arrays or other hardware devices may be used to implement one or more of the methods, or portions of the methods, disclosed herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method, comprising:
   receiving, at a first aircraft computing agent associated with a first aircraft, a conflict notice from a first airfield computing agent associated with a first airfield, wherein the conflict notice is received by the first aircraft computing agent in response to the first airfield computing agent proactively identifying a potential conflict that will cause a maximum on ground (MOG) limit to be exceeded at the first airfield and identifying the first aircraft as contributing to the potential conflict, wherein the conflict notice indicates that the first aircraft is associated with the potential conflict, wherein the first aircraft computing agent includes at least one of a hardware computing element or a software module executed by one or more processors, and wherein the first airfield computing agent includes at least one of a second hardware computing element or a second software module executed by one or more processors;
   identifying, by the first aircraft computing agent, based on parameters associated with the first aircraft, one or more actions associated with the first aircraft that would address the potential conflict in response to receiving the conflict notice, wherein identifying comprises negotiating, by the first aircraft computing agent, with at least one second airfield computing agent to select one or more viable actions of the one or more actions;
   sending, by the first aircraft computing agent, a conflict notice response to the first airfield computing agent in response to identifying the one or more actions associated with the first aircraft that would address the potential conflict;
   receiving, by the first aircraft computing agent, an instruction to perform a first action from the first airfield computing agent in response to sending the conflict notice response, wherein the first action is selected based on a cost function that ranks the one or more actions based on criteria including a cumulative amount of schedule change for all aircraft affected by the one or more actions; and
   automatically executing, by the first aircraft computing agent, the first action of the one or more actions in response to receiving the instruction to generate an updated flight schedule, wherein the first aircraft operates according to the updated flight schedule.

2. The method of claim 1, wherein the first aircraft computing agent includes the parameters associated with the first aircraft and decision support rules related to the parameters, and wherein the first airfield computing agent includes conflict rules to proactively identify potential conflicts at the first airfield that will cause the MOG limit to be exceeded at the first airfield and attempt to negotiate with one or more aircraft computing agents to automatically resolve the potential conflicts.

3. The method of claim 2, wherein the decision support rules include the cost function.

4. The method of claim 1, wherein negotiating with the at least one second airfield computing agent comprises:
   sending, by the first aircraft computing agent, a query to the at least one second airfield computing agent, wherein the query requests information to determine whether a particular action of the one or more actions can be performed; and
   receiving, by the first aircraft computing agent, a response to the query from the at least one second airfield computing agent.

5. The method of claim 1, wherein automatically executing the first action comprises sending, by the first aircraft computing agent, a schedule change notice.

6. The method of claim 5, wherein the schedule change notice is sent by the first aircraft computing agent to at least one of the first airfield computing agent, the at least one second airfield computing agent, a second aircraft computing agent, or a scheduling database.

7. The method of claim 1, wherein the parameters include at least one of crew parameters, maintenance parameters, flight plan parameters, legal requirements, environmental parameters, or aircraft limitations.

8. The method of claim 1, wherein the cost function is applied to the one or more actions to:
   sort the one or more actions;
   identify a lowest cost action of the one or more actions; or
   eliminate an action from the one or more actions.

9. A method, comprising:
   proactively identifying, at a first airfield computing agent associated with a first airfield, a potential conflict that will cause a maximum on ground (MOG) limit to be exceeded at the first airfield, wherein the first airfield computing agent includes at least one of a hardware computing element or a software module executed by one or more processors;
   identifying, by the first airfield computing agent, one or more aircraft contributing to the potential conflict that will cause the MOG limit to be exceeded at the first airfield in response to identifying the potential conflict;
   sending, by the first airfield computing agent, a conflict notice to one or more aircraft computing agents associated with the one or more aircraft contributing to the potential conflict that will cause the MOG limit to be exceeded at the first airfield in response to identifying the one or more aircraft, the conflict notice including information descriptive of the potential conflict;
   receiving, by the first airfield computing agent, at least one conflict notice response from at least one aircraft computing agent of the one or more aircraft computing agents in response to sending the conflict notice, the at least one conflict notice response indicating at least one action that can be performed by the at least one aircraft to address the potential conflict;

automatically selecting, by the first airfield computing agent, a particular action to be executed to address the potential conflict in response to receiving the at least one conflict notice response, wherein the particular action is selected based on a cost function that ranks the at least one action based on criteria including a cumulative amount of schedule changes for all aircraft affected by the at least one action; and sending, by the first airfield computing agent, an instruction to a particular aircraft computing agent associated with a particular aircraft in response to automatically selecting the particular action, the instruction indicating that the particular action is to be automatically executed to generate an updated flight schedule, wherein the particular aircraft operates according to the updated flight schedule.

10. The method of claim 9, wherein the criteria further includes an amount of a first schedule change for the particular aircraft.

11. The method of claim 10, wherein the criteria further includes a number of aircraft affected.

12. The method of claim 9, wherein the particular action completely resolves the potential conflict.

13. The method of claim 9, further comprising, when the particular action only partially resolves the potential conflict to a partially resolved potential conflict, sending, by the first airfield computing agent, a second conflict notice to the one or more aircraft computing agents associated with the one or more aircraft, the second conflict notice including information descriptive of the partially resolved potential conflict.

14. The method of claim 13, further comprising:
receiving, by the first airfield computing agent, at least one second conflict notice response from at least one second aircraft computing agent of the one or more aircraft computing agents, the at least one second conflict notice response indicating at least one second action that can be performed by at least one second aircraft to address the partially resolved potential conflict;
automatically selecting, by the first airfield computing agent, a particular second action to be executed to address the partially resolved potential conflict; and
sending, by the first airfield computing agent, a second instruction to a particular second aircraft computing agent, the second instruction indicating that the particular second action is to be automatically executed.

15. The method of claim 9, further comprising receiving, by the first airfield computing agent, data associated with operation of the first airfield, wherein the potential conflict is identified based on the data, and wherein the data comprises at least one of weather data, weather forecast data, aircraft crew information, aircraft status information, flight plan information, information about schedules, or information about operations of the first airfield.

16. The method of claim 9, wherein the information descriptive of the potential conflict in the conflict notice includes at least one of a date that the potential conflict is expected to occur, a time that the potential conflict is expected to occur, a resource of the first airfield that is affected by the potential conflict, or a limitation of the first airfield that causes the potential conflict.

17. A non-transitory computer-readable medium storing instructions that are executable by a processor to cause the processor to:
instantiate one or more airfield computing agents, wherein each airfield computing agent includes parameters associated with a particular airfield and conflict rules associated with the particular airfield, wherein each airfield computing agent includes at least one of a hardware computing element or a software module executed by one or more processors;
wherein a first airfield computing agent of the one or more instantiated airfield computing agents is configured to negotiate with one or more aircraft computing agents to automatically address potential conflicts at a first airfield associated with the first airfield computing agent including:
proactively identify, at the first airfield computing agent, a potential conflict that will cause a maximum on ground (MOG) limit to be exceeded at the first airfield;
identify, by the first airfield computing agent, one or more aircraft contributing to the potential conflict that will cause the MOG limit to be exceeded at the first airfield in response to identifying the potential conflict;
send, by the first airfield computing agent, a conflict notice to one or more aircraft computing agents associated with the one or more aircraft contributing to the potential conflict that will cause the MOG limit to be exceeded at the first airfield in response to identifying the one or more aircraft, the conflict notice including information descriptive of the potential conflict;
receive, by the first airfield computing agent, at least one conflict notice response from at least one aircraft computing agent of the one or more aircraft computing agents in response to sending the conflict notice, the at least one conflict notice response indicating at least one action that can be performed by the at least one aircraft to address the potential conflict;
automatically select, by the first airfield computing agent, a particular action to be executed to address the potential conflict in response to receiving the at least one conflict notice response, wherein the particular action is selected based on a cost function that ranks the at least one action based on criteria including a cumulative amount of schedule change for all aircraft affected by the at least one action; and
send, by the first airfield computing agent, a first instruction to a particular aircraft computing agent associated with a particular aircraft in response to automatically selecting the particular action, the instruction indicating that the particular action is to be automatically executed to generate an updated flight schedule, wherein the particular aircraft operates according to the updated flight schedule.

18. The non-transitory computer-readable medium of claim 17, wherein a first aircraft computing agent receiving the conflict notice from the first airfield computing agent is configured to negotiate with the one or more instantiated airfield computing agents to identify available actions to address the potential conflicts.

19. The non-transitory computer-readable medium of claim 18, wherein the first aircraft computing agent receiving the conflict notice from the first airfield computing agent is further configured to automatically execute a selected action in response to an airfield computing agent accepting the selected action.

20. The non-transitory computer-readable medium of claim 18, wherein the first aircraft computing agent receiving the conflict notice from the first airfield computing agent is further configured to gather data from one or more remote computing systems to identify available actions.

* * * * *